Sept. 8, 1959 T. A. LEONARD, JR 2,903,274
PROPELLER CARRIER
Filed Nov. 29, 1957 2 Sheets-Sheet 1

INVENTOR
Talbert A. Leonard, Jr.
BY Mason, Fenwick & Lawrence
ATTORNEYS

Sept. 8, 1959 T. A. LEONARD, JR 2,903,274
PROPELLER CARRIER
Filed Nov. 29, 1957 2 Sheets-Sheet 2

INVENTOR
Talbert A. Leonard, Jr.
BY Mason, Fenwick & Lawrence
ATTORNEYS

United States Patent Office 2,903,274
Patented Sept. 8, 1959

2,903,274

PROPELLER CARRIER

Talbert A. Leonard, Jr., Miami, Fla.

Application November 29, 1957, Serial No. 699,553

2 Claims. (Cl. 280—179)

This invention relates to a means for supporting heavy articles and equipment on transport carriers such as railroad flat cars or trucks or trailers and more particularly to a support for holding an article which has one relatively small dimension with respect to its other dimensions, these latter mentioned dimensions being greater than the width of the carrier.

The present invention will be described with respect to a large ship propeller the diameter of which is much greater than its height; and the diameter of the propeller considerably exceeding the width of the truck or trailer on which it is to be carried. Such a propeller could not be mounted horizontally on the truck or trailer, since the projecting portions of the blades would be a menace to traffic and would not pass through some of the single-lane underpasses. If the propeller were mounted vertically on the carrier, the height would be so great that it would make the routing of the transport vehicle a difficult problem since the vertical clearance in underpasses, bridges and for utility wires extending over the highway would greatly restrict the selection of a route. It would also raise the center of gravity of the loaded vehicle so much that the danger of upset would be very great.

An object of the present invention, therefore, is to provide a support which is easily attachable to and removable from a truck or trailer bed, by means of which an article or piece of equipment having two dimensions grossly exceeding the width of the truck or trailer bed and having one dimension relatively small with respect to its other dimensions may be transported at a transverse angle with respect to the bed of the carrier to present the least possible overall height and width to a lane of the highway or right of way.

It is also an object of the present invention to provide such a support on which the article may be easily loaded by a crane or other hoist equipment.

Other objects and advantages of the present invention will become apparent to one skilled in the art from the following description when read in conjunction with the accompanying drawings.

Ship propellers of the type to be transported on a support of the present invention are very heavy; and they are loaded on transport carriers by means of a crane, usually of the overhead travelling type. The operator of such a crane may move an article with ease along straight lines in rectilinear horizontal and vertical planes. However, even a highly skilled crane operator cannot accurately move an article with such a crane along a course which is at an angle to vertical and horizontal planes. Thus, if a rigid support were provided hving a spindle tilted at an angle to receive the propeller shaft bore of the propeller, it would be a very difficult and time-consuming operation to load the propeller on the rigid support and the danger of damaging the propeller would be likely. This problem is overcome by the present invention in that the spindle which receives the propeller is mounted on a hinged platform which will swing from a horizontal position to a tilted position. When the platform is lowered to a horizontal position the spindle extends from the platform in a vertical direction and the propeller may be easily lowered on the spindle. After it is in place on the spindle the platform can then be raised and fixed in a tilted position.

Figure 1:
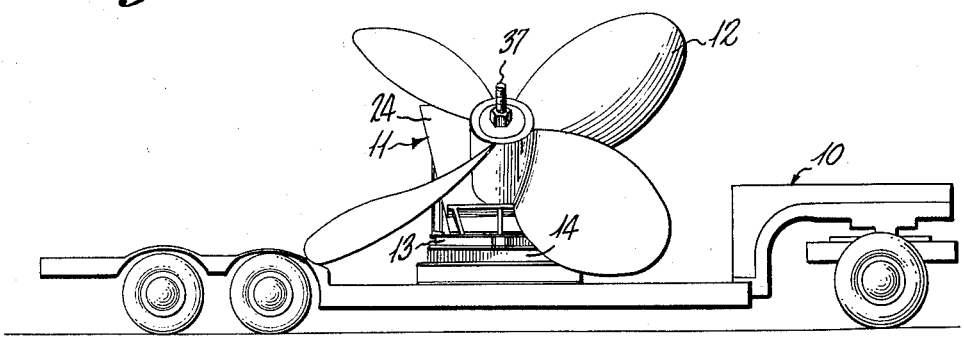
Figure 1 is a side elevation of a highway trailer on the bed of which the support of the present invention is mounted and showing a ship's propeller in position on the support for transportation over a highway.

Adverting now to the drawing, there is shown in Figure 1 a low-bed trailer 10. The support 11 of the present invention is mounted approximately midway the length of the trailer 10. Secured to the support 11 is a ship's propeller 12 which is to be supported at a transverse angle of 45° with respect to the bed of the trailer for transportation.

Figure 3:
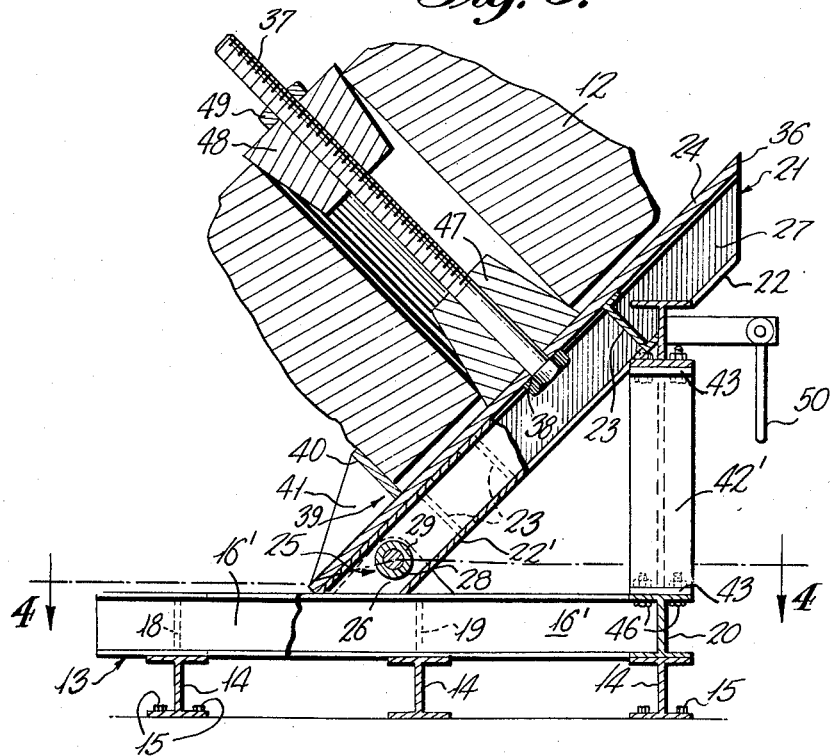
Figure 3 is a transverse sectional view taken on the line 3—3 of Figure 2.
Figure 4:
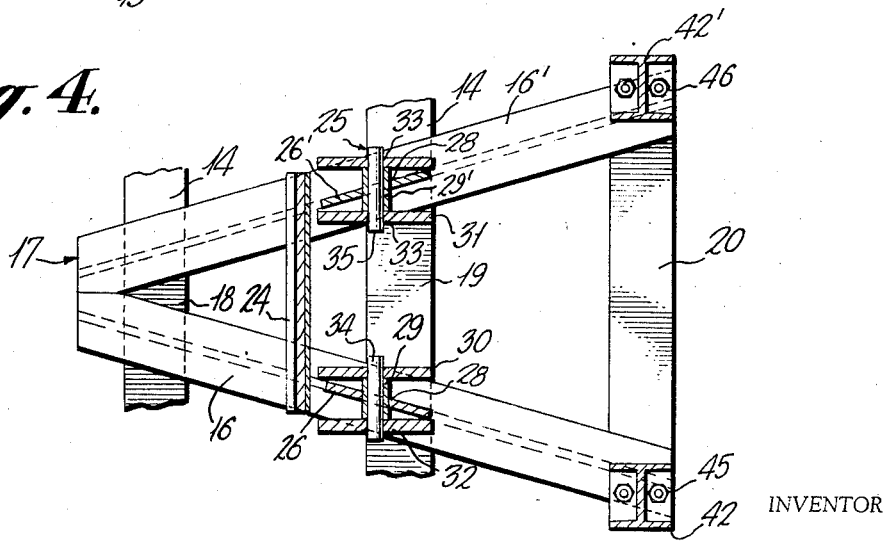
Figure 4 is a horizontal sectional view taken on the line 4—4 of Figure 3.

A base 13, as shown best in Figures 3 and 4, is formed of spaced apart I-beams 14, which extend longitudinally of the bed of the trailer 10 to which they are bolted as at 15 or otherwise attached. A pair of I-beams 16—16' are welded together at one end and spaced apart at the other to form a V-shaped base superstructure 17. The I-beams 16—16' are secured transversely across the I-beams 14 by any suitable means such as welding or the like and cross-braced with I-beam struts 18, 19, 20.

A platform 21, comprising a pair of I-beams 22, 22' cross-braced by means of channel bars 23, to form a framework for a wedge shaped steel plate 24, is swingably hinged as at 25 to the base 13.

The I-beams 22—22' at the hinge end of the platform 21 have a portion of their lower flanges removed, and the ends 26—26' of the vertical webs 27 are cut on an angle of 45°, as shown in Figure 3. Adjacent the ends 26, 26', the vertical webs 27 have bores 28 to receive the bearings 29, 29'. The bearings 29, 29' are tubular and are welded in the bores 28. A pair of upstanding lugs 30 and 31 are welded to each of the I-beams 16, 16', respectively, and are bored as at 32 and 33 to receive pins 34 and 35, respectively, the pins 34 and 35 also passing through the bearings 29, 29' to hingedly connect the platform 21 to the base 13. The pairs of upstanding lugs 30 and 31 are positioned at approximately the longitudinal mid-point of the I-beams 16, 16'. The end 36 of the platform 21, when in its tilted position, extends outwardly beyond the base 13 very little, but in its horizontal position the end 36 extends considerably beyond the edge of the base 13.

Figure 2:
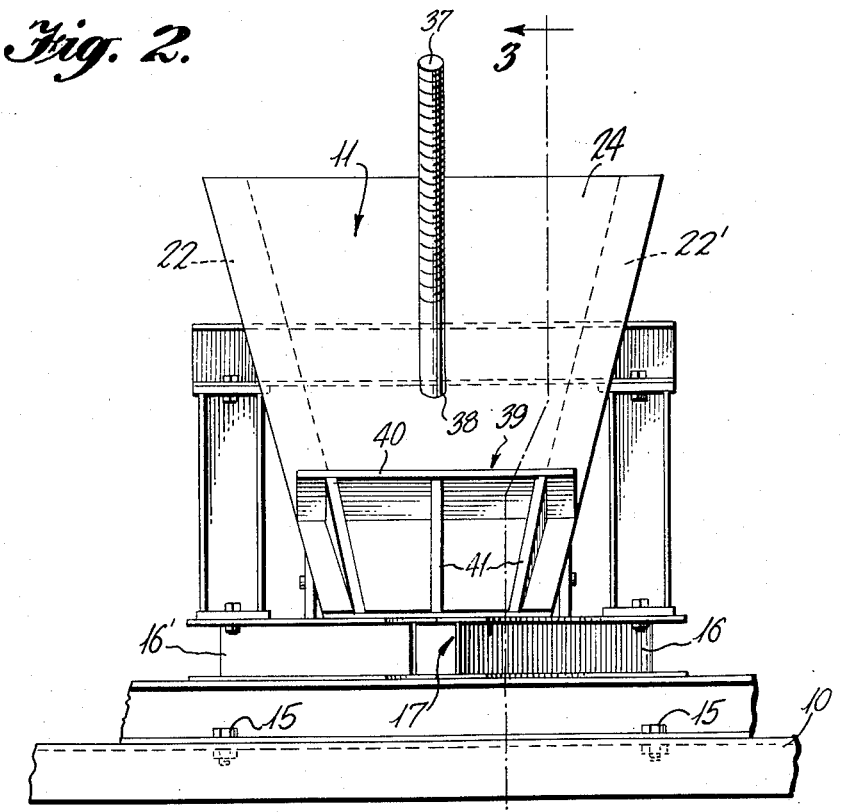
Figure 2 is a side elevation of the support showing the tiltable platform in raised position, portions of the bracing for the platform being shown in dotted lines.

For attaching the ship's propeller blade to the platform 21 a screwthreaded spindle 37 is fixed at the approximate midpoint of the platform 21, as shown in Figures 2 and 3. The spindle 37 may be formed as a headed bolt, as shown, and inserted through a hole 38 drilled in the plate 24 to which it may be fastened in position, if desired, as by welding or the like. The spindle 37 passes through the propeller shaft opening in the hub of the propeller to be mounted on platform 21. A bracket 39 having a face plate 40 and braces 41 is securely fixed to steel plate 24, as by welding, to engage the outer portion of the hub of the propeller 12. The bracket 39 bears most of the weight of the propeller and the principal purpose of the spindle 37 is to hold the propeller against tipping. To hold the platform 21 in a tilted position, a pair of chocks 42, 42' made of I-beams having plates 43 welded on each end extend between the I-beams 16, 16' respectively and a seat 44, The seat 44 is an I-beam welded to the I-beams 22, 22' at an angle of 45°. The chocks 42, 42' are secured in place by means of the bolts 45 and 46, respectively.

A center apertured truncated cone-shaped lower bearing block 47 is placed on the spindle 37 before the propeller is lowered on the spindle to center the propeller thereon. An upper truncated cone-shaped center apertured bearing block 48 is inserted on the spindle 37 after the propeller has been lowered on the spindle. The nut 49 is then threaded on the spindle 37 and tightened to secure the propeller in position on the support. The crane line may then be attached to the clevis shackle 50 and the platform 21 with the propeller secured thereto raised to tilted position and the chocks 42, 42' bolted in place. Due to the position of the hinge 25 being offset to one side of the center line of the bed of the trailer, the weight of the propeller is evenly distributed on the trailer and the center of gravity of the loaded vehicle is raised but little.

When the propeller arrives at its destination the unloading crane holds the platform 21 while the chocks 42, 42' are removed and lowers the platform to horizontal position. The propeller may then be quickly and easily removed from the spindle 33 with the least possible danger of damaging it.

While there has been disclosed in the foregoing description a practical embodiment of a support for use on a transport carrier for a ship's propeller in accordance with the present invention, it will be understood by those skilled in the art that variations in the implementation of the concept of the invention are within the purview and scope of the invention.

What is claimed is:

1. A support for use on a wheeled transport carrier to hold a ship's propeller which has a diameter wider than the wheelbase width of said wheeled transport carrier comprising, a base attachable to said wheeled transport carrier, a platform tiltably mounted on said base on an axis parallel to the direction of longitudinal movement of said wheeled transport carrier, said mounting being at the longitudinal center line of said carrier, a spindle mounted on said platform to extend vertically therefrom and positioned on said platform to lie within the vertically projected side edge of said carrier, said platform having a range of movement from a position in which the axis of the propeller is vertical and a portion of said propeller extends outward beyond the projected side edge of said carrier to a tilted position in which said propeller lies substantially within the projected sides of said carrier, means for moving said platform and said propeller to a position to bring said propeller within said projected sides of said carrier, and means for holding said platform in said last mentioned position.

2. In combination with a transport carrier a support for a ship's propeller to be rigged on said carrier by means of a crane comprising, a V-shaped base attachable transversely across the bed of said carrier, a bearing bracket mounted on each arm of said V-shaped base at substantially the midpoint thereof, said bearing brackets being in longitudinal alignment with the bed of said carrier, a wedge-shaped platform having bearing means cooperating with said brackets for pivotally connecting said platform to said bearing brackets of said V-shaped base, a spindle vertically mounted on said wedge-shaped platform in substantial vertical alignment with the projected edge of said carrier, said wedge-shaped platform being swingable about its pivotal connection from a horizontal position in which said propeller may be lowered by said crane to thread the bore of said propeller onto said spindle, to an angular position for transporting said propeller over a highway, and chock means for holding said platform in said angular position.

References Cited in the file of this patent

UNITED STATES PATENTS

| 1,322,678 | Draver | Nov. 25, 1919 |
| 2,270,203 | Saunders | Jan. 13, 1942 |
| 2,606,735 | Zembrosky et al. | Aug. 12, 1952 |

FOREIGN PATENTS

| 806,440 | France | Sept. 28, 1936 |
| 185,802 | Germany | June 22, 1906 |
| 378,323 | Italy | Jan. 30, 1940 |